(12) United States Patent
Cordoba Sanchez et al.

(10) Patent No.: US 9,769,989 B2
(45) Date of Patent: Sep. 26, 2017

(54) ERGONOMIC TOOL FOR CUTTING FLOWERS AND FRUITS

(75) Inventors: Jorge Enrique Cordoba Sanchez, Bogotá (CO); Javier Mauricio Fajardo Romero, Bogotá (CO); Leonardo Augusto Quintana, Bogotá (CO); Alvaro Enrique Hilarion, Bogotá (CO)

(73) Assignee: PONTIFICIA UNIVERSIDAD JAVERIANA, Columbia ( * ) Notice: Subject to any disclaimer, the term of this patent is extended or adjusted under 35 U.S.C. 154(b) by 401 days.

(21) Appl. No.: 13/813,416

(22) PCT Filed: Jul. 27, 2011

(86) PCT No.: PCT/IB2011/053349
§ 371 (c)(1),
(2), (4) Date: May 13, 2013

(87) PCT Pub. No.: WO2012/014167
PCT Pub. Date: Feb. 2, 2012

(65) Prior Publication Data
US 2013/0219722 A1    Aug. 29, 2013

(30) Foreign Application Priority Data

Jul. 30, 2010   (CO) ........................................ 093246

(51) Int. Cl.
*A01G 3/02*        (2006.01)
*B26B 13/26*       (2006.01)
*B26B 13/20*       (2006.01)

(52) U.S. Cl.
CPC ................ *A01G 3/02* (2013.01); *B26B 13/20* (2013.01); *B26B 13/26* (2013.01)

(58) Field of Classification Search
CPC ........................................... B26B 13/12–13/20
USPC .......... 30/131–135, 194–204, 225–239, 271, 30/272, 257, 248
See application file for complete search history.

(56) References Cited

U.S. PATENT DOCUMENTS

| 354,363 | A | * | 12/1886 | Titus ............................... 30/232 |
| 833,714 | A | * | 10/1906 | Goode ............................. 30/231 |
| 876,915 | A | * | 1/1908 | Rufty .............................. 30/257 |
| 1,042,240 | A | * | 10/1912 | Lillick ............................ 56/331 |
| 5,496,625 | A | | 3/1996 | Lilani |
| 5,659,959 | A | * | 8/1997 | Parlowski ............... B26B 13/20 16/430 |

(Continued)

FOREIGN PATENT DOCUMENTS

| EP | 0 704 150 | 4/1996 |
| ES | 279948 | 11/1984 |

(Continued)

OTHER PUBLICATIONS

International Search Report for International Application No. PCT/IB2011/053349 dated May 9, 2012.

*Primary Examiner* — Laura M Lee
(74) *Attorney, Agent, or Firm* — Merchant & Gould P.C.

(57) ABSTRACT

The invention relates to an ergonomically designed tool for the intensive cutting of flowers and fruit, configured such that it can be gripped with the whole hand. According to the invention, the handles occupy a position in which they are perpendicular or almost perpendicular to the cutting blades, thereby minimizing the risk of injury to the upper limbs.

18 Claims, 5 Drawing Sheets

(56) References Cited

U.S. PATENT DOCUMENTS

| | | | |
|---|---|---|---|
| 5,979,061 A * | 11/1999 | Demlakian-Apkarian | 30/261 |
| 6,260,277 B1 * | 7/2001 | Wu | A01G 3/02 |
| | | | 30/232 |
| 6,373,903 B1 | 4/2002 | Wynn | |
| 2002/0066188 A1 * | 6/2002 | Wu | 30/250 |
| 2005/0252353 A1 | 11/2005 | Alber et al. | |

FOREIGN PATENT DOCUMENTS

| | | |
|---|---|---|
| ES | 2 140 519 | 3/2000 |
| ES | 2 329 738 | 11/2009 |
| ES | 2 331 123 | 12/2009 |
| GB | 996658 | 3/1964 |
| GB | 996685 | 4/1964 |
| JP | 8-299621 | 11/1996 |

* cited by examiner

ERGONOMIC TOOL FOR CUTTING FLOWERS AND FRUITS

This application is a National Stage Application of PCT/IB2011/053349, filed 27 Jul. 2011, which claims benefit of Serial No. 10-093246, filed 30 Jul. 2010 in Colombia and which application(s) are incorporated herein by reference. To the extent appropriate, a claim of priority is made to each of the above disclosed applications.

TECHNICAL FIELD

The present invention relates to an ergonomically designed tool for intensive cutting of flowers and fruits. It is based on a new concept in which the cutting elements are located in the horizontal plane of the tool while the handles, which enable the tool support, are located on the vertical plane, i.e. are arranged at an angle of 70° to 110°, preferably at an angle of 90° in relation to the central axis of the tool.

BACKGROUND

Cutting tools, manual scissors or shears type, are used for progressive cutting of a material. Hand shears work with a cross lever, and necessarily require human power to hold and operate them; they are used in different fields of human activity, including gardening and growing and harvesting of flowers and fruits. These mechanisms are known as bypass cutting and usually consist of a sharp steel blade at 23° and a counter-blade, also in steel, called anvil which provides support to the stem while being sheared. This system produces a net cut bezel that is used for any kind of pruning, from formation to maintenance and fructification.

However, existing tools in the prior art are not the most appropriate for the tasks in intensive crops such as flowers or fruit, because they cause muscle tension, awkward postures, contact pressure and other health risks for workers, which can lead to damage such as lesions in the hand, wrist and arm (such as tendinitis or carpal tunnel syndrome—CTS), engaging in turn muscles, nerves, tendons, ligaments, joints, cartilage and blood vessels in the upper extremities. To this is added a repetition of moves that leads to small muscle fatigue, an impact that worsens with mandatory use of gloves, demanding the worker an additional effort, which increases the danger of injury.

Most flower farms in Latin America use imported scissors (Felco® and Bahco®), which were designed for people of different anthropometric measures and were not specifically designed for cutting flower stems. These circumstances generate an extra effort when the worker hold them and operate them.

Added to this, the position adopted by the hand-wrist joint, produces radial and ulnar deviations, which with the passage of time and the repeatability demanded by the activity, are detrimental to the limb.

In an attempt to avoid or reduce these negative effects, in recent years there have been numerous designs in the area of hand tools to meet the needs of the end user. Among them is the invention disclosed in patent EP0529566, which presents gardener shears provided with an upper handle with a counter blade, a lower handle equipped with a blade and a scissors joint, which presents two sections articulated in form of superposed annular discs. These sections are attached to the blade and to the counter blade. They also have a threaded sleeve with a threaded joint screw, means for absorbing the radial load and independent means for absorbing the axial load. These shears are characterized by having in its upper part outside the cutting zone of the blade and counter blade, on the periphery of the articulated sections in form of annular discs of the upper handle and lower handle, respective notches or cracks that can be matched and that function as wire cutters.

The document EP 0704150 presents cutting pliers for one hand, comprising in particular a first handle having a cutting blade and a second handle having a counter blade or a second cutting blade, the two handles being connected by a pin in order to permit cutting with scissors effect, wherein one of the two handles is longer than the other handle, the extra length of the longer handle being such that the user can easily press with the palm of the second hand on the length available beyond that already used by the fingers of the first hand. The cutting shears also comprise a compression spring located between the first and second handles, means for regulating a force of pivoting friction at the pin connecting the first and second handles, means for locking the nippers in a closed position, means for limiting movement in a closing direction, means for limiting movement in an opening direction and means for protecting the first and second handles.

The application GB996685 relates to shears and similar tools comprising a handle, which is used as a support for the first, second, third and fourth fingers, and the grip stock of which is movable relatively to the associated handle arm whereas the grip stock against which the thumb bears is connected fast to the associated handle arm. So, the movable grip stock is adapted to rotate about the longitudinal axis of the associated handle arm and that the longitudinal axis of the movable grip stock is disposed obliquely to the longitudinal axis of the associated handle arm in such a manner that the two longitudinal axes form an acute angle with one another, the apex of which is in the vicinity of the first finger bearing zone, the longitudinal axis of the movable grip stock being situated, in the vicinity of the outer end thereof, when the shears are closed, nearer to the fixed grip stock than the longitudinal axis of the associated handle arm, so that all the phalanxes of the first, second, third and fourth fingers when the shears are opened and closed bear at least approximately with their full internal surfaces against the movable grip stock.

The American document U.S. Pat. No. 5,469,625 presents a hand pruner which provides a maximum force on the blades when the handles are closed halfway with a constant force being applied to the handles. It has an ergonomic configuration of the operating handle which is bent at the operating end to permit better viewing of the cutting blades as well as reducing carpal tunnel fatigue in the arm of the operator. The hand pruner presented in this document comprises a first handle having a first pivot section and a handle section (the handle pivots to an angle of maximum 30° with respect to the second handle). A second handle having a second pivot section and a second handle section, a first pin pivotally connecting said first pivot section to said second pivot section, a hook having one end pivotally connected to said second handle section, a bolt pivotally connecting said one end of said hook to said second handle section, a stationary cutting blade mounted in said second handle section and having one end secured to said bolt and the other end located in the path of travel of said hook and a pair of links connecting said hook to said first pivot section whereby the pivotal movement of said first handle with respect to said second handle will pull the hook into engagement with said stationary blade. In one embodiment the invention includes an anvil mounted on the hook into the path of travel of the blade.

The American application US2005252353 shows a grip comprising an angled handle, at least one fixing element, and a tool fastening portion arranged at the end portion of the angled handle. The fixing element may be connected with a bottom part of the angled handle in such a manner that the distance between the angled handle and the fixing element is adjustable to allow an object to be firmly engaged so that it may be securely avoided that the tool is undesirably lost (for instance falls down).

The handle and the fixing element may be made of a deformable material and may be firmly connected to each other. An elongated hole is formed in the angled handle; a pin corresponding to the elongated hole is provided and attached to the fixing element. The pin extends through the elongated hole to allow guiding the fixing element with respect to the angled handle by shifting the pin along the elongated hole. The shear may comprise an operating lever with a stripping-off edge, a fixed pivotal point and a retracting element, for instance a spring element. The user may fasten four of her or his fingers and operate the operating layer with his or her thumb to perform the cutting quickly and accurately. The retracting element may drive back the cutting elements into their biased initial position. In an alternative embodiment of this invention, the handle may include a knob to adjust the distance between the angled handle and the fixing element.

Finally, the Spanish application ES279948 presents a hand tool for cutting and harvesting leathery stemmed agricultural products, particularly fruits such as grapes. It comprises a handle formed by two articulated arms around a pivot axis. The arms are bent and have at their ends a pick carrying the cutting elements. The pick axis forms an angle between 60° and 150° with the axis of the handle. The elements are composed of a removable blade attached to the pick by two pins and by a flange that serves to support the cutting blade. The pick has an angled profile and the flange has a flat surface, relatively wide, which is opposed to the inner surface of the pick carrying the cutting blade, forming a clamp arranged to grab the stem of the fruit after cutting. One feature of the tool is that one of the arms of the handle is provided with a spring to bear against the other arm, to maintain the two picks in the open position and where at least the clamping surface of the lower pick is serrated. This tool ensures that, regardless of the diameter of the stem of the fruit to be cut, and with the condition that this is introduced into the bottom of the opening of the tool, the gripping surfaces of the two picks come into function to grip the stem and retaining the fruit before the blade cuts the stem completely. Additionally, with limited opening angle of the picks, the operator doesn't have to make any effort to limit the separation of the arms of the handle, since it only has to overcome the resistance of the spring during the cutting phase, thereby reducing fatigue.

Despite the existence of various hand tools on the market, it is necessary to design a tool for cut flowers or fruits with a smoother recoil spring and a smaller opening of the handles of the scissors. Likewise, we should take into account parameters such as tool weight, anatomical handles designed according to workers anthropometry in fruit crops and floriculture in Latin America, optimization of the length of the blades, the angle between the handles and the level of the blades, and improvement of the gravity center position of the tool relative to the hand.

Other characteristics which should be taken into account are the structure of the gripping surface and its materials, including degree of friction, the possibility of using different handles, the mechanical strength required for its operation, the transmission level of the forces and the use of gloves as their use increases the force required for said operation.

OBJECT OF THE INVENTION

Figure 1:
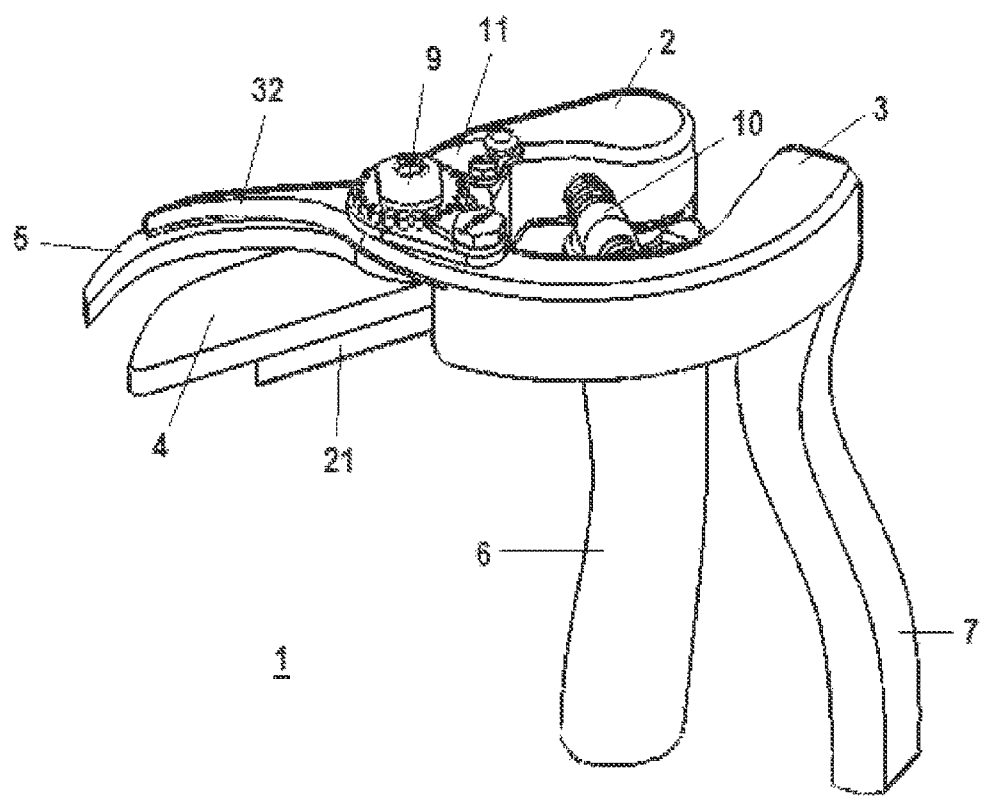
FIG. 1 is a perspective view of the cutting tool invention designed ergonomically for intensive cutting of flowers and fruits.
Figure 2:
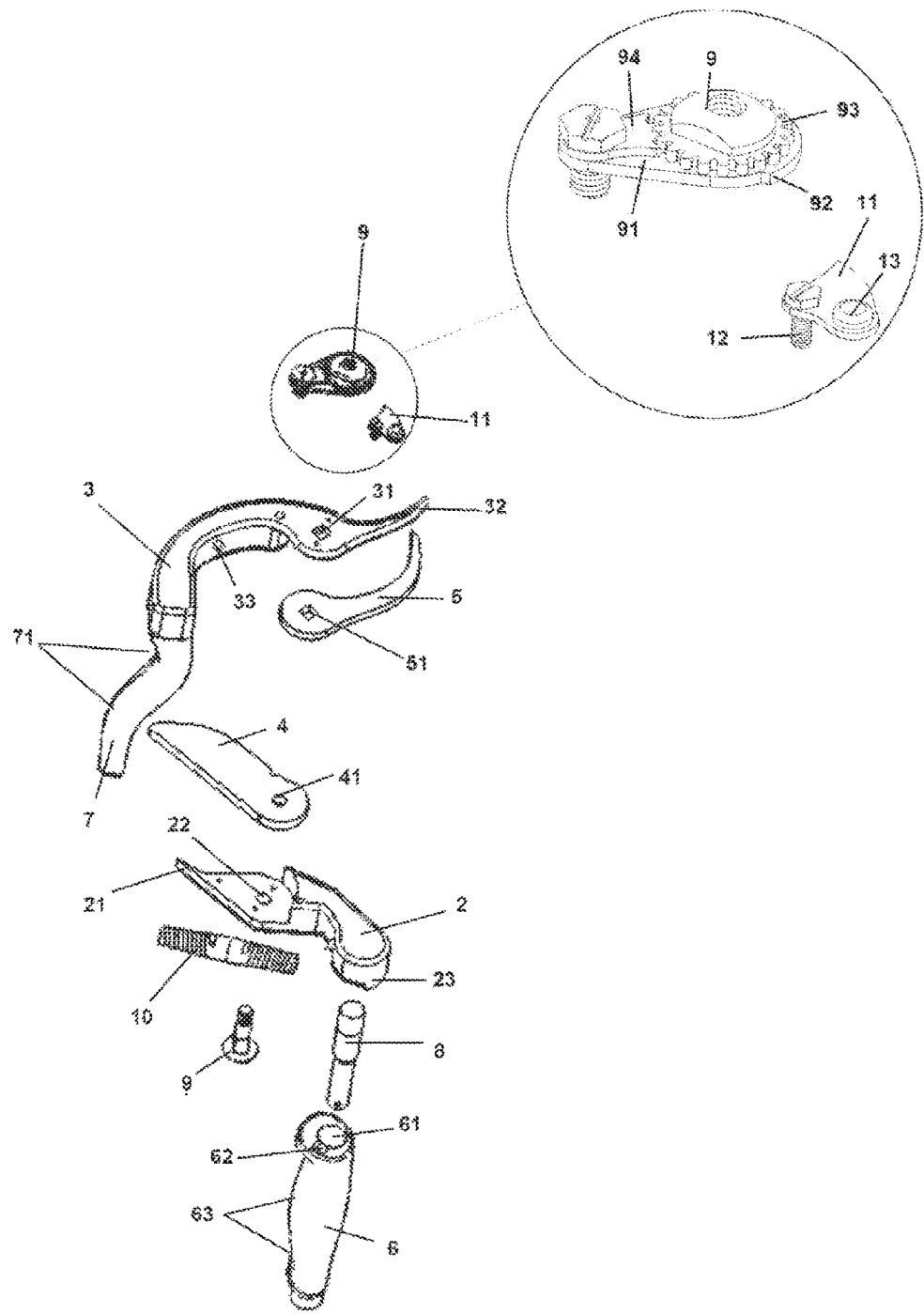
FIG. 2 is a top exploded perspective view of FIG. 1
Figure 3:
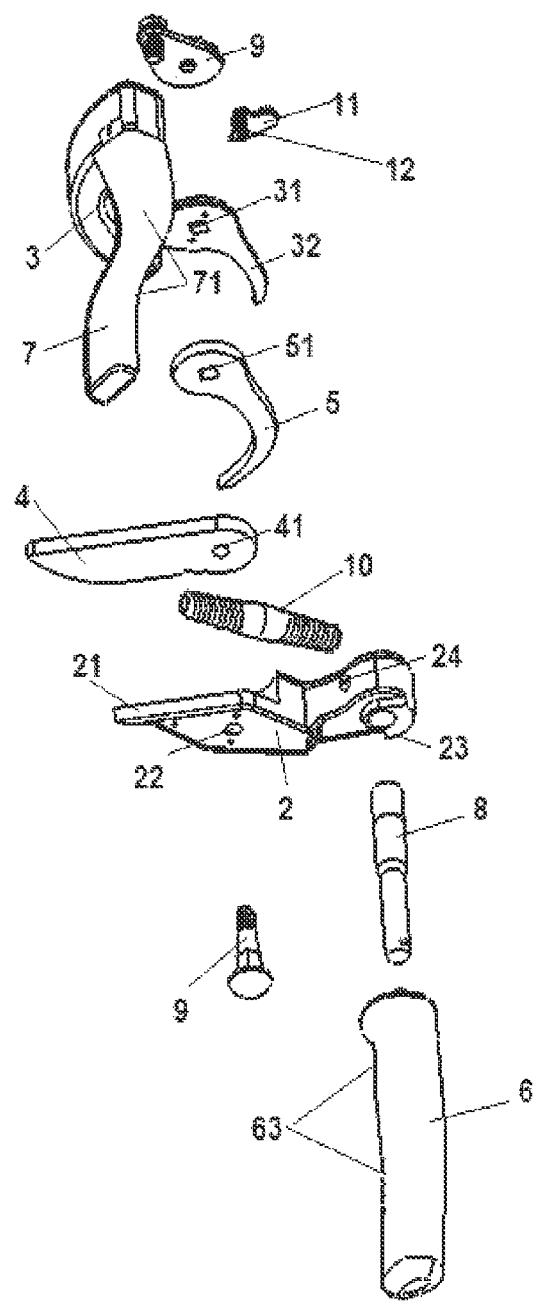
FIG. 3 is a bottom exploded perspective view of FIG. 1
Figure 4:
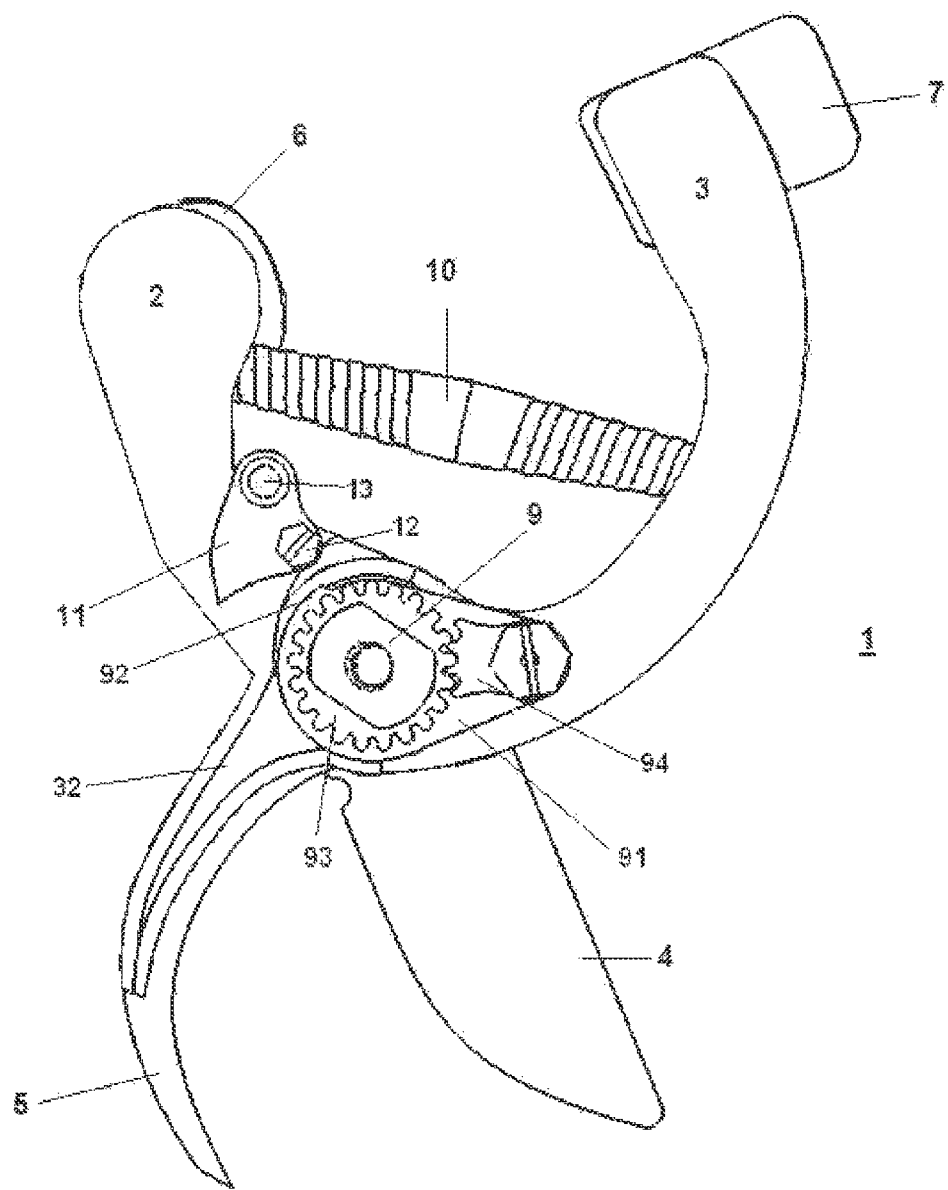
FIG. 4 is a top view of the invention in the open position.
Figure 5:
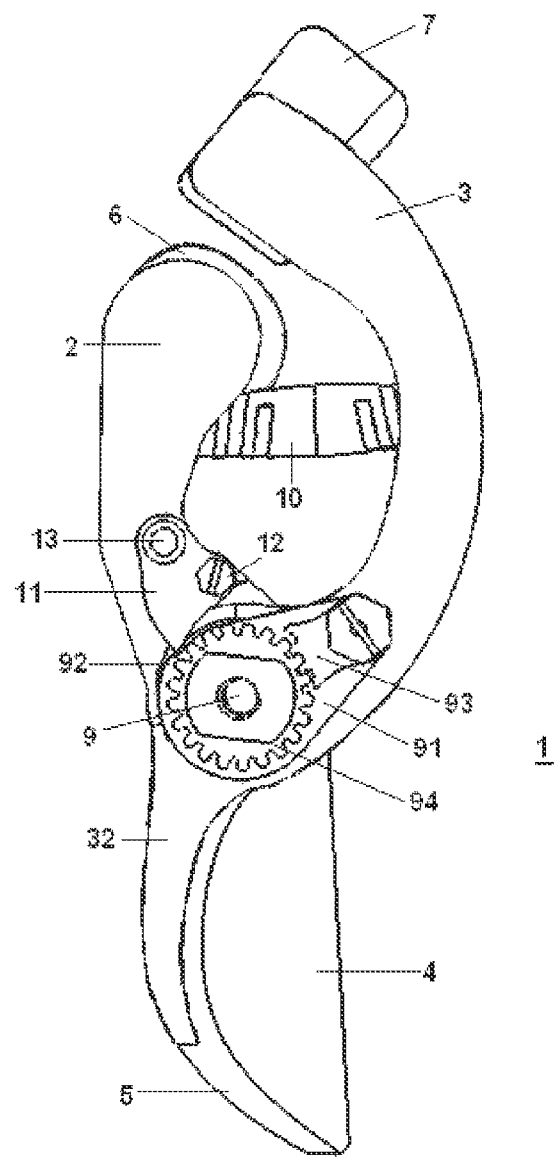
FIG. 5 is a top view of the invention in the closed position.

The object of the invention relates to an ergonomically designed tool for intensive cutting of flowers or fruits, which has a configuration enabling full hand grip, in which the handles are perpendicular or near perpendicular with respect to the cutting blades, minimizing the risks of generating upper extremity injuries.

DETAILED DESCRIPTION OF THE INVENTION

Generally, the ergonomically designed tool (1) for intensive cutting of flowers and fruits has a configuration in which the cutting elements are located in the horizontal plane of the tool while the handles, which enable the tool support, are located on
the vertical plane, i.e. are arranged at an angle of 70° to 120°, preferably at an angle of 90° to 100° in relation to the central axis of the tool.

This tool (1) is essentially constituted by two or more support elements (2, 3) that support the cutting elements (4) and anvil (5), the cutting element (4) is blade-like and is driven horizontally to move and hit the anvil (5), a rotary grip element (6) which allows a rotational movement and when operated slides in the horizontal direction towards the fixed handle element (7). Said rotating handle element enables a rotational movement around its axis through a handle pin element (8), which facilitates handling and proper transmission of force from the user's hand to the cutting blade (4) generating a maximum area of contact between the cutting tool (1) and the user's hand, thus decreasing the pressure in specific areas of the hand; a bolt system (9) connecting the anvil (5) to support (3) which, in turn, is attached at its opposite end and fixedly to the handle (7) and connects the cutting element (4) to the support element (2) which is connected by its opposite end with the rotary handle (6), allowing adjustment of the blade (4) and the anvil (5), and a spring (10) secured on the inner sidewalls of the support elements (2, 3) arranged transversely or longitudinally to the tool (1), to allow join or separate fixed handles (7) and rotating (6), thereby opening and closing the tool (1).

Among the various possibilities of assembling the cutting tool of the present invention presented below are some preferred embodiments. However, it is understood that modifications and variations of the tool that conserve the configuration in which the cutting elements are located in the horizontal plane of the tool while the handles, which enable the tool support, are located on the vertical plane, i.e. are arranged at an angle of 70° to 120°, preferably at an angle of 90° to 100° in relation to the central axis of the tool, from the elements set forth herein, shall be understood within the scope of the present invention.

In a first embodiment of the invention, the tool (1) ergonomically designed for intensive cutting of flowers or fruits comprises a support element (2) connected at one end to the rotary grip (6) and at the opposite end has a projection (21) on which is fixed the cutting element (4), which is secured by the bolt system (9) which passes through the orifice (22) of the support element (2) and the orifice (41) of the blade. This bolt (9) also passes through the orifice (51) of the anvil (5) and the hole (31) of the support (3), holding the cutting element (4) and the anvil (5) so that the cutting element (4) rotates around the screw or bolt (9) moving in a horizontal plane until it hits the anvil type element (5), making the cut.

Said support (3), like the support element (2), presents a projection (32) which is fixed to the anvil (5), thereby improving the durability of the tool and reducing the possibility that the cutting elements (4, 5) of the tool are out of adjustment. In general, the support elements (2, 3) the bolt (9) and the blades of the cutting element (4) and the anvil (5) are manufactured from metal, metal alloys, polymers or ceramics.

Another essential element of the tool of the invention is the rotary grip (6), allowing a rotational movement about its own axis through the grip pin (8), which facilitates handling and proper transmission of force of the user's hand to the cutting blade (4), decreasing the pressure in specific areas of the hand. Said rotary grip (6) comprises a perforation (61), preferably coated with a material of low coefficient of friction, which facilitates rotation of the handle about the pin (8) projecting from the lower surface of the support element (2).

In a preferred embodiment, the rotary grip (6) and the lower surface of the support element (2) have a pair of stops (62, 23) which collide limiting the circular movement of said handle (6) about its own axis to a certain point.

The handles (6, 7) of the invention are made of a material selected from the group comprising polymers, ceramics, metals, metal alloys and can even be produced in metal and polymer-coated, ensuring greater tool life while improving the grip. Optionally, the pieces may be hollow or have perforations to reduce the weight of the tool. Preferably, these handles have a series of concave and convex shapes (63, 71) that allow the coupling of the fingers and hand in the right places for a better grip of the tool (1).

The rotary grip (6) and the fixed handle (7) allow cutting the plant stems while maintaining the wrist of the user aligned with the forearm, due to which said handles are disposed at an angle whose amplitude varies between 70° to 120°, preferably 90° to 100°, in relation to the central axis of the tool (1).

Additionally, the cutting tool (1) includes a safety element (11) which is attached by a fixing element (12) to the upper surface of the support element (2), being movable on it, so that by rotating towards cutting elements fits into a notch (92) existing in the plate (91) of the bolt (9), keeping the mechanism closed when not using the tool. Optionally, the safety element (11) may comprise a protruding structure (13), which facilitates movement of the safety element (11) to move from the closed to open position and vice versa.

Finally, the tool comprises a spring element (10) which is pressed into a pair of projections (24, 33) arranged on the inner sidewalls of the support elements (2, 3) of the tool.

In a preferred embodiment of the invention, the cutting element (4) and the anvil (5) are secured to their respective support elements (2, 3) by fastening elements selected from the group consisting of rivets, pins, screws, adhesives, welds, etc.

Another option also covered in this application is the tool (1) in which the bolt (9) comprises a plate (91) with a notch (92) which fits into the safety element (11), and a sprocket (93), having teeth that engage with the teeth of a toothed platet (94). The toothed mechanism (93-94) allows adjustment of the cutting elements and also acts as a brake to prevent misalignment with the use of the cutting elements (4, 5) of the tool.

In an ideal embodiment of the invention, the spring (10) is made of a metallic material, metal alloy or a polymer that recovers the rigidity coefficient of the material. For this tool (1), the spring (10) can be produced from a sheet or wire with circular profile, with forms of regular and irregular polygons.

So, the cutting tool of the present application ensures that the extension of the wrist flexion is no greater than 20° and prevents radial deflection greater than 20°. Likewise, decreases the force required to actuate said cutting element (4) so that the maximum pressure for cutting is 10 N.

The invention claimed is:

1. A cutting tool for intensive cutting of flowers and fruits, comprising
    a cutting element located in a horizontal plane of the tool, wherein the cutting element comprises a blade and an anvil and wherein the blade is configured to pivot towards and away from the anvil about a pivot axis;
    a first and a second handle located in a vertical plane of the tool, wherein the cutting element is arranged at an angle of 70° to 120° in relation to the position of at least one of the first and second handles; and
    a first support element with a first curvature supporting the anvil and a second support element with a second curvature supporting the cutting element, the first and second curvatures extending away from each other, and a spring secured between the first and second support elements;
    wherein the first handle is connected to the blade and wherein the second handle is connected to the anvil;
    wherein the first and second handles are normally biased apart and configured to be gripped by a single hand of the user;
    wherein at least one of the first and second handles includes a rotary grip element that defines the outside surface of the handle and rotates about a longitudinal axis of the handle;
    wherein the rotary grip element is configured to rotate due to contact with the user's hand in a first direction when the blade is pivoted towards the anvil and is configured to rotate in a second direction that is opposite the first direction when the blade is pivoted away from the anvil;
    wherein a bolt system connects the anvil to a first end of the first support element and connects the cutting element to a first end of the second support element, and the second ends of the first and second support elements are attached to the second and first handles respectively;
    wherein the first end of the first support element comprises a curved projection to which the anvil is fixed;
    wherein the first end of the second support element forms a straight projection to which the cutting element is fixed; and
    wherein the blade, anvil, and first and second projection each comprise an orifice aligned with the pivot axis and the bolt system passes through the orifices to allow the blade to rotate about the bolt system relative to the anvil.

2. The cutting tool according to claim 1, wherein the cutting element is arranged at an angle of 90° to 100° in relation to the position of the handles.

3. The cutting tool according to claim 1, wherein the first handle includes the rotary grip element and the second handle comprises a fixed handle element.

4. The cutting tool according to claim 3, wherein the support elements, the bolt system, the blade and the anvil are manufactured from a material selected from the group consisting of metal, metal alloys, polymers and ceramics.

5. The cutting tool according to claim 3, wherein the cutting element and the anvil are secured to their respective support elements by fastening elements selected from the group consisting of rivets, pins, screws, adhesives, and welds.

6. The cutting tool according to claim 3, wherein the rotary grip element comprises a central aperture, and wherein the cutting tool further comprises a pin element that projects from the lower surface of the second support element and extends into the central aperture.

7. The cutting tool according to claim 6, wherein the central aperture is coated with a material of low coefficient of friction, to facilitate rotation of the rotary grip element around the pin element.

8. The cutting tool according to claim 3, wherein the rotary grip element and the lower surface of the second support element have a pair of stops which collide, limiting the circular movement of the rotary grip element about its own axis.

9. The cutting tool according to claim 3, wherein the handles of the invention are made of one or more materials selected from the group consisting of polymers, ceramics, metals, and metal alloys.

10. The cutting tool according to claim 9, wherein the handles are hollow or have perforations.

11. The cutting tool according to claim 9, wherein the handles have a series of concave and convex shapes that allow the coupling of a user's fingers to the tool.

12. The cutting tool according to claim 3, wherein the bolt system comprises a plate with a notch and a sprocket having teeth that engage with teeth of a toothed plate.

13. The cutting tool according to claim 3, wherein a rotatable safety element is attached by a fixing element to the upper surface of the second support element, wherein when the safety element rotates towards the cutting element, the safety element fits into a notch in a plate of the bolt system, keeping the tool closed when not in use.

14. The cutting tool according to claim 13, wherein the safety element comprises a protruding structure, which facilitates movement of the safety element from a closed to an open position and vice versa.

15. The cutting tool according to claim 3, wherein the spring is pressed into projections arranged on the inner sidewalls of the support elements of the tool.

16. The cutting tool according to claim 3, wherein the spring is made of one or more materials selected from the group consisting of metallic materials, metal alloys and polymers.

17. The cutting tool according to claim 16, wherein the spring is produced from a sheet or wire with a circular profile, and has a shape comprising regular and irregular polygons.

18. The cutting tool according to claim 1, wherein the first handle includes the rotary grip element that defines the outside surface of the handle and rotates about a longitudinal axis of the handle.

* * * * *